(12) United States Patent
Searfoss (10) Patent No.: US 7,594,687 B2
(45) Date of Patent: Sep. 29, 2009

(54) CONTAINER TRUCK COVER SYSTEM

(75) Inventor: Timothy K. Searfoss, Alger, MI (US)

(73) Assignee: Roll-Rite, LLC, Alger, MI (US)

( * ) Notice: Subject to any disclaimer, the term of this patent is extended or adjusted under 35 U.S.C. 154(b) by 0 days.

(21) Appl. No.: 11/972,345

(22) Filed: Jan. 10, 2008

(65) Prior Publication Data

US 2009/0179452 A1 Jul. 16, 2009

(51) Int. Cl.
*B60P 7/04* (2006.01)

(52) U.S. Cl. ............... 296/98; 296/100.18; 296/100.16

(58) Field of Classification Search .............. 296/98, 296/101, 100.11, 100.12, 100.14, 100.15, 296/100.18, 100.16
See application file for complete search history.

(56) References Cited

U.S. PATENT DOCUMENTS

| | | | |
|---|---|---|---|
| 5,031,955 A | 7/1991 | Searfoss | |
| 5,238,287 A | 8/1993 | Haddad, Jr. | |
| 5,292,169 A | 3/1994 | O'Brian | |
| 5,527,953 A | 6/1996 | Shaer | |
| 5,752,735 A | 5/1998 | Fleming et al. | |
| 5,829,819 A | 11/1998 | Searfoss | |
| 5,887,937 A | 3/1999 | Searfoss | |
| 5,944,374 A | 8/1999 | Searfoss | |
| 6,206,449 B1 | 3/2001 | Searfoss | |
| 6,237,985 B1 | 5/2001 | O'Brian | |
| 6,257,646 B1 | 7/2001 | Searfoss | |
| 6,464,283 B2 | 10/2002 | Haddad, Jr. | |
| 6,527,331 B2 | 3/2003 | Searfoss | |
| 6,695,382 B2 | 2/2004 | Ciferri et al. | |
| 6,695,383 B2 | 2/2004 | Wood | |
| 6,783,168 B2 | 8/2004 | Searfoss | |
| 6,814,386 B2 | 11/2004 | Wood | |
| 6,857,620 B2 | 2/2005 | Payne | |
| 6,893,071 B2 | 5/2005 | Chabot | |
| 6,896,312 B2 | 5/2005 | Talbot | |
| 6,899,362 B1 | 5/2005 | Weinerman et al. | |
| 6,916,060 B2 | 7/2005 | Searfoss | |
| 6,974,176 B2 | 12/2005 | Smith et al. | |
| 7,118,157 B1 | 10/2006 | Bromberek | |
| 7,147,265 B1 | 12/2006 | Schmeichel | |
| 7,189,042 B1 | 3/2007 | Schmit | |
| 2002/0014780 A1* | 2/2002 | Searfoss | 296/100.14 |
| 2004/0021336 A1 | 2/2004 | Wood | |
| 2004/0239142 A1 | 12/2004 | Payntz | |
| 2006/0043754 A1* | 3/2006 | Smith | 296/98 |
| 2006/0208526 A1 | 9/2006 | Talbot et al. | |

(Continued)

OTHER PUBLICATIONS

"We Stock AutoTarpers! Call Now," Advertisement, Holt Industries, Inc. (www.holtzindustries.com/obriant.htm); American Waste Digest, vol. 19, No. 2, Nov. 2007, p. 63.

(Continued)

*Primary Examiner*—Jason S Morrow
(74) *Attorney, Agent, or Firm*—Robert K. Roth; Miller, Canfield, Paddock and Stone, PLC (57) ABSTRACT

An assembly for covering a load on a truck comprises a tower, a rotatable axle fixedly mounted with respect to the tower, and a base connected to the axle. The base is rotatable to a position above horizontal by a linkage.

16 Claims, 14 Drawing Sheets

U.S. PATENT DOCUMENTS

2007/0035152 A1    2/2007    Talbot et al.
2007/0102951 A1    5/2007    Chenowth
2007/0222253 A1*    9/2007    Wood et al. .................. 296/98

OTHER PUBLICATIONS

"For A Limited Time Only" Advertisement, Pioneer Cover-All Tarping System, (hhtp://www.pioneercoverall.com//order/index. php?act=viewProd&productId=2522), American Waste Digest, vol. 19, No. 2, Nov. 2007, p. 18.

"TarpersUSA Presents 'The Hankey' Lock Your Load!" Advertisement, TarpersUSA (TarpersUSA.com), American Waste Digest, vol. 18, No. 11, Aug. 2007, p. 75.

* cited by examiner

CONTAINER TRUCK COVER SYSTEM

BACKGROUND

1. Field of the Disclosure

This disclosure generally relates to covers for trucks, and more particularly relates to a truck cover system.

2. Background Art

Many truck trailers, particularly those hauling loose loads such as sand and gravel, need a cover to prevent the wind from blowing load particles off the load bed. Various apparatus have been devised for covering a trailer load. Some such apparatus include a motor for selectively winding a flexible cover. An effective cover should be one that is easily operated by the truck driver so as to selectively cover and uncover the load from the convenient location of the truck cab. My U.S. Pat. No. 5,031,955 provides a truck cover that may be conveniently motor operated from the cab of a truck to extend the cover from a winding assembly proximate the front of the truck bed and toward the rear of the truck bed.

Container trucks present special problems. In particular, such container trucks tend to have differently sized beds, and are required to accept containers of different dimensions. To accommodate these variances, the arms normally used in conventional truck bed covers have to be long enough to reach from their mounting point to both the front and rear ends of the truck bed.

BRIEF DESCRIPTION OF THE DRAWINGS

The present disclosure may be better understood, and its numerous features and advantages made apparent to those skilled in the art by referencing the accompanying drawings. Embodiments incorporating teachings of the present disclosure are shown and described with respect to the drawings presented herein, in which.

It will be appreciated that for simplicity and clarity of illustration, elements illustrated in the Figures have not necessarily been drawn to scale. For example, the dimensions of some of the elements are exaggerated relative to other elements. The use of the same reference symbols in different drawings indicates similar or identical items.

DETAILED DESCRIPTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
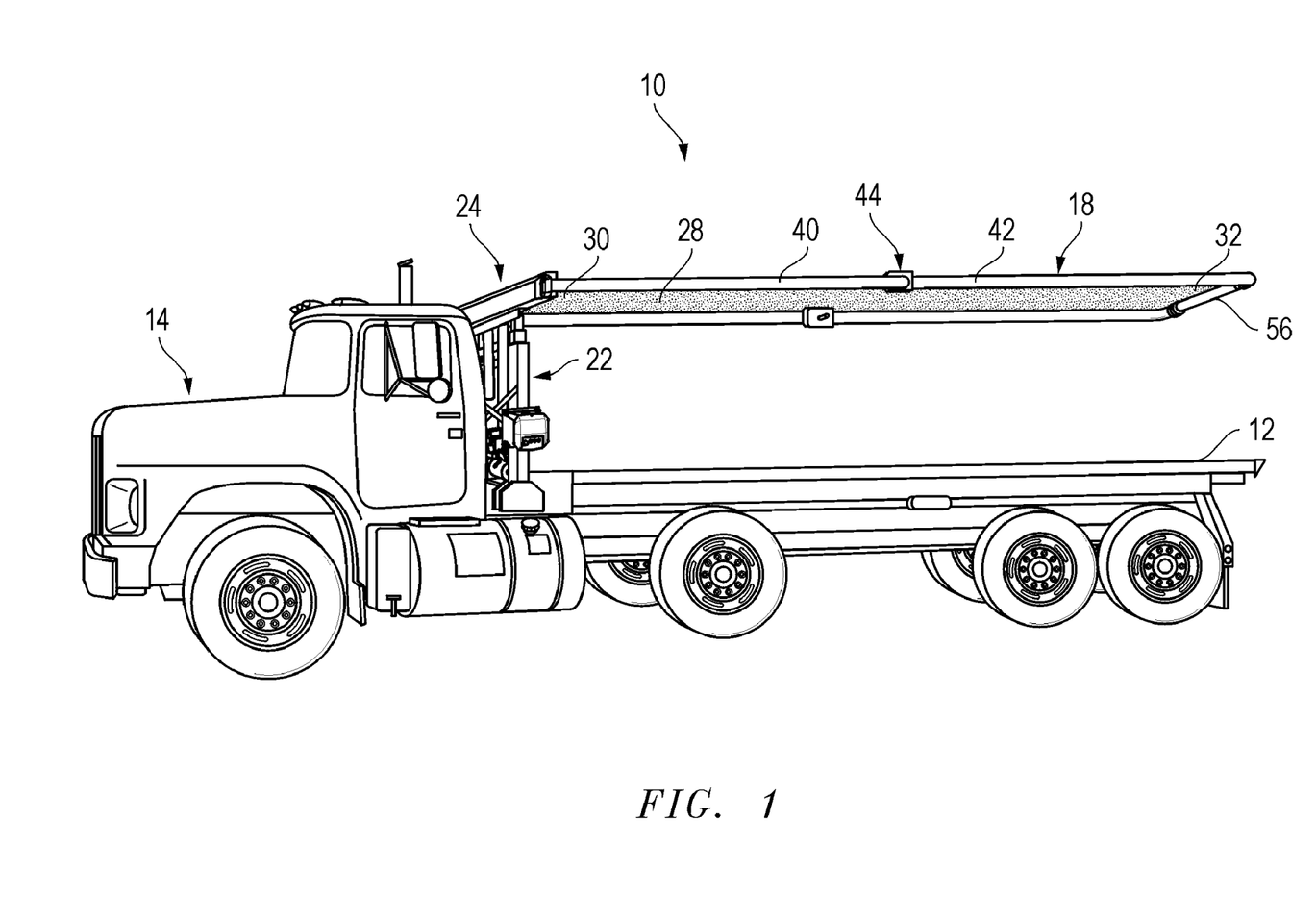
FIG. 1 is a perspective view of a truck including an apparatus for moving a cover over a bed of the truck.
Figure 16:
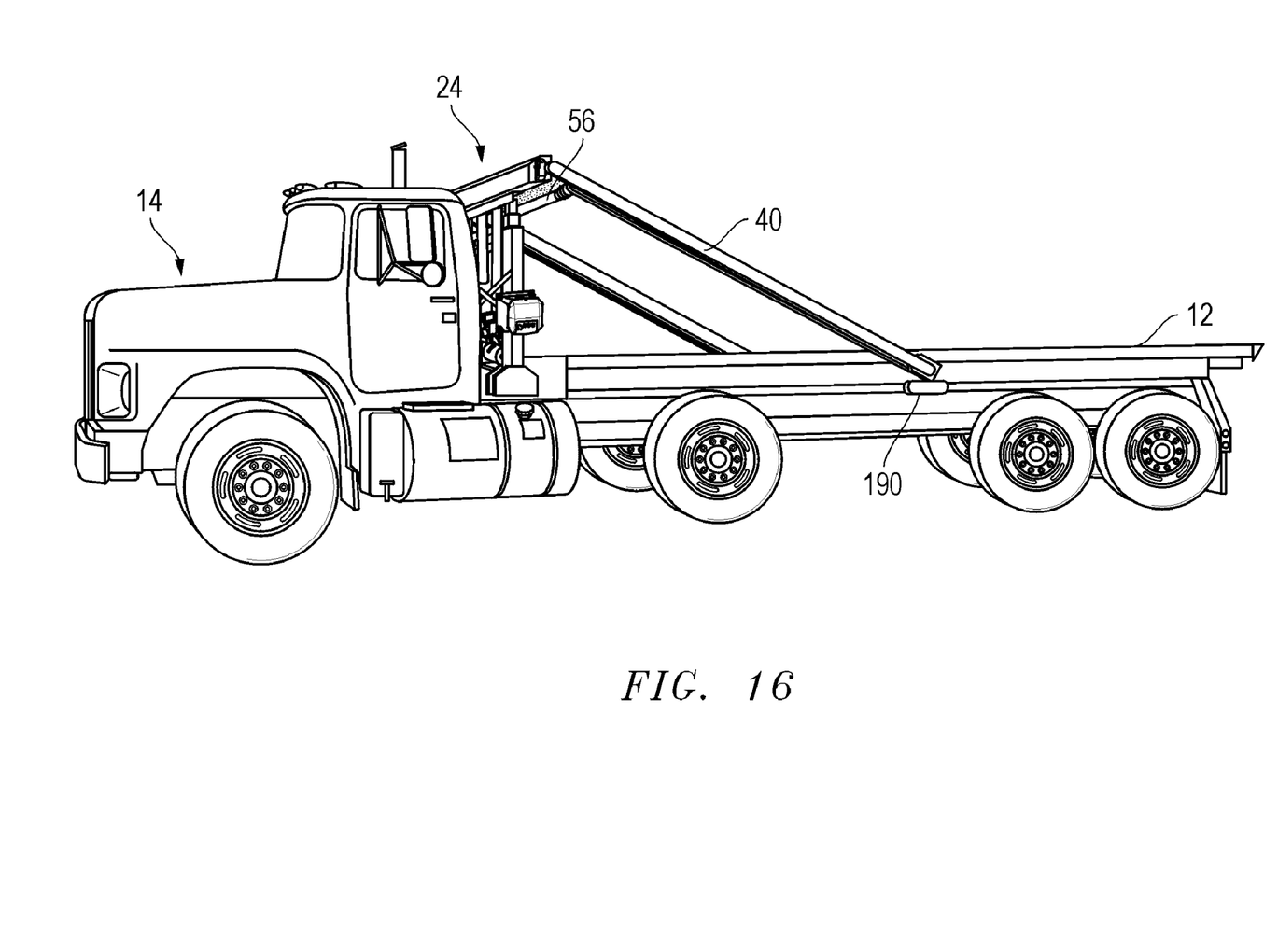
FIG. 16 is a perspective view of the truck with the arm assembly in a stowed position.

FIG. 1 shows an apparatus 10 for covering a bed defined by a frame 12 of a truck 14. While the truck is shown unloaded, it should be appreciated that the present disclosure contemplates that a container or other load may be carried on the frame 12. The apparatus 10 includes a pair of bows 18 and a tower 22. The tower 22 is disposed proximate the front of the truck frame 12, and is hydraulically movable between a lowered position shown in FIG. 1 and a raised position shown in FIG. 16. The tower 22 carries a head assembly 24 that includes a spool rotatably mounted within the head assembly. A preferably flexible cloth or tarpaulin cover 28 is windable on the spool, with a first end 30 connected to the spool and a distal second end 32.

Figure 2:
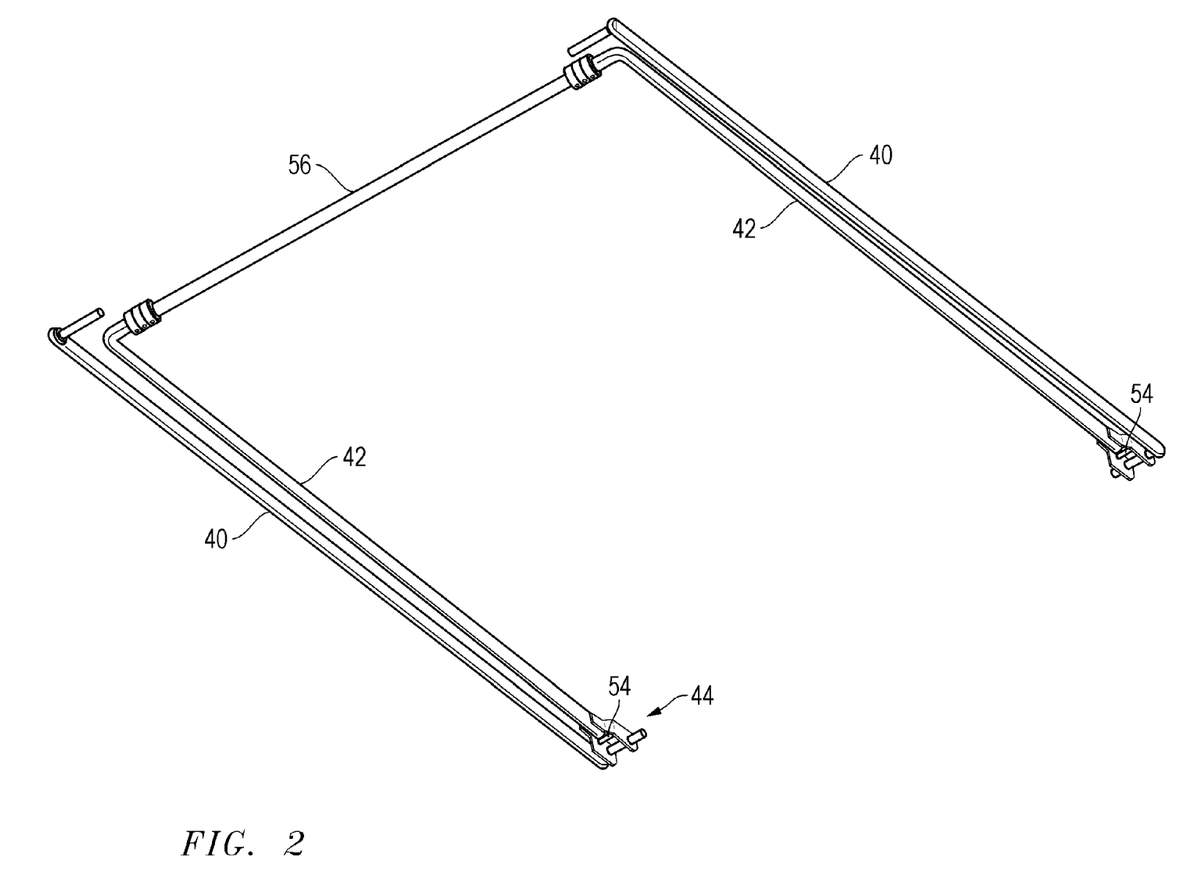
FIG. 2 is a perspective view of an arm assembly for the apparatus.
Figure 3:
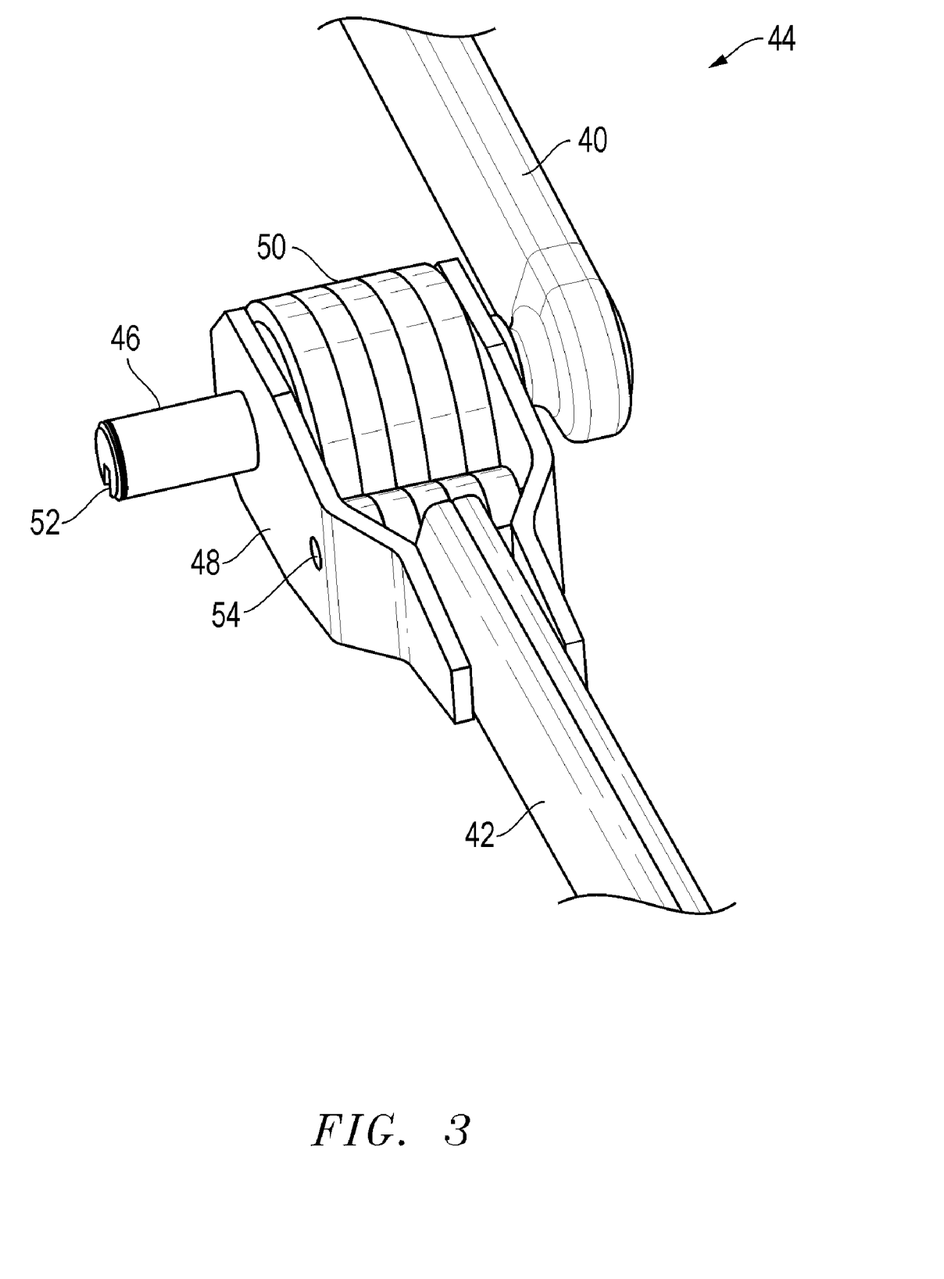
FIG. 3 is a perspective view of a connection of the arm assembly including a plurality of springs.

The bows 18 each include a base 40 and an extension 42. Each base 40 is preferably pivotably mounted to a respective side of the head assembly 24, as described more fully below. Each extension 42 is pivotally connected at one of its ends to a corresponding base 40 by a hinge or knuckle 44. As shown in FIGS. 2 and 3, a knuckle shaft 46 is preferably welded or otherwise fixed to extend perpendicularly from a distal end of each base 40. The knuckle shaft 46 extends through a pair of plates 48 extending from one end of the extension 42 such that the knuckle shaft is rotatable with respect to the extension. One end of each of a plurality of spiral torsion springs 50 preferably engages an axial groove 52 formed in the knuckle shaft. The other ends of the springs 50 cooperate with a knuckle locator pin 54. In this way, the extensions 42 are normally biased clockwise as shown in FIG. 1. By varying the position of the locator pins, the preload of the springs, the number of springs and/or the spring constant of the springs, the force biasing each base away from its respective extension is variable. In a preferred embodiment, five springs are used in the knuckle 44 between each base 40 and extension 42.

The extension 42 of each bow 18 is connected to the distal end 32 of the cover 28, preferably by way of a transverse bow member 56. The bows 18 are preferably formed of fabricated or extruded aluminum or steel alloy, and are disposed proximate the opposite sides of the truck frame 12. In a preferred embodiment, the bases 40 extend no wider than the container carried on the frame 12, normally in a range of about eight to eight and one-half feet. The extensions 42 lie inside their respective bases.

Figure 4:
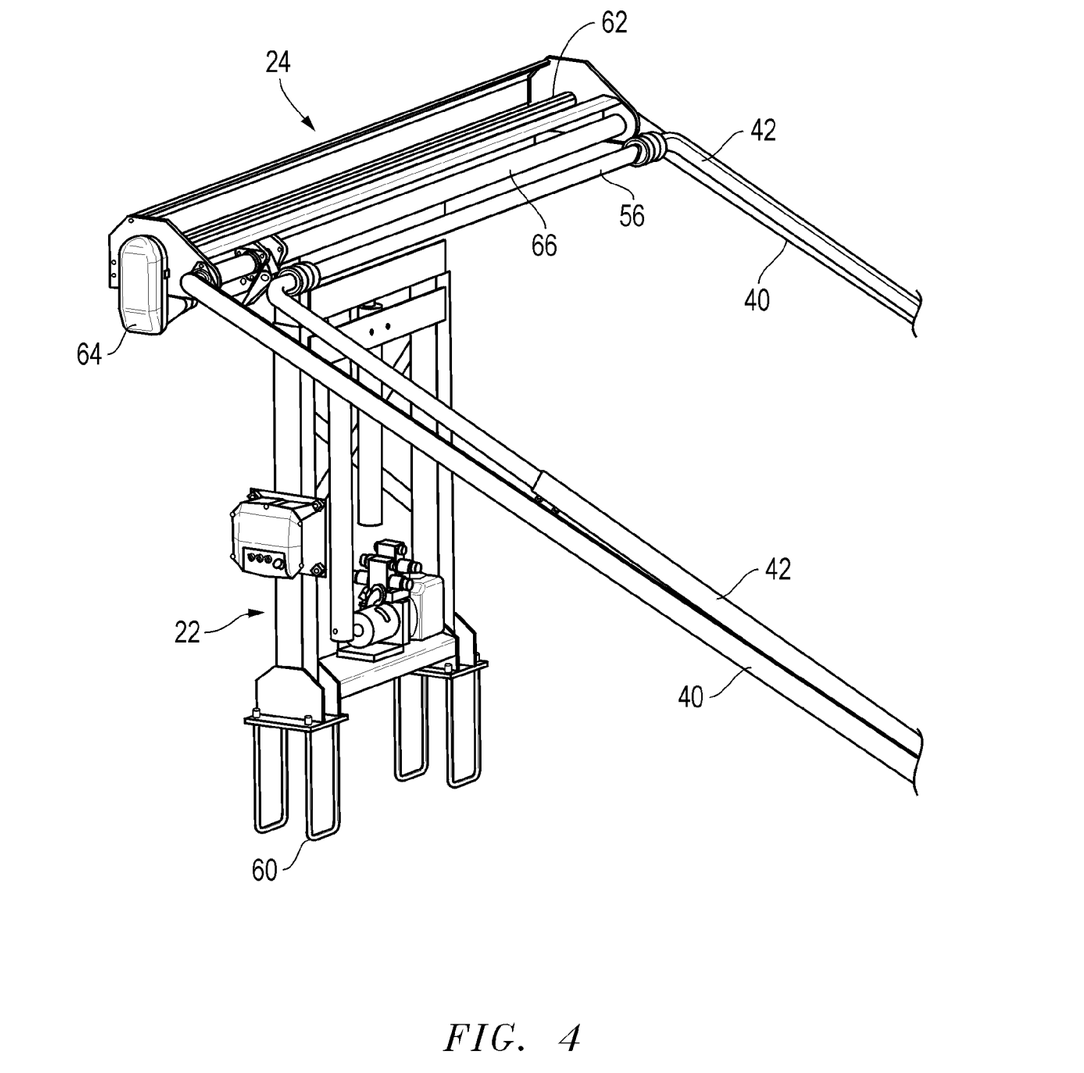
FIG. 4 is a perspective view of a tower and a head assembly.

FIG. 4 shows the tower 22 and the head assembly 24 in greater detail. The lower end of the tower 22 is securable to the frame of the truck 14, preferably by a plurality of U-shaped hangers 60, and is extendable as described more fully below. The head assembly 24 is disposed generally on top of the tower 22, and includes the spool 62, a motor 64, and an axle 66. The motor 64 is preferably a direct drive electric gear motor, such as one described in my U.S. Pat. No. 5,829,819, and is drivingly engaged with the spool 62 to wind the cover 28 against the rearward bias normally developed on the bows by the pivot mounting 44. The axle 66 is rotatably mounted to the head assembly 24, and is fixed at its opposite ends to the bases 40.

Figure 5:
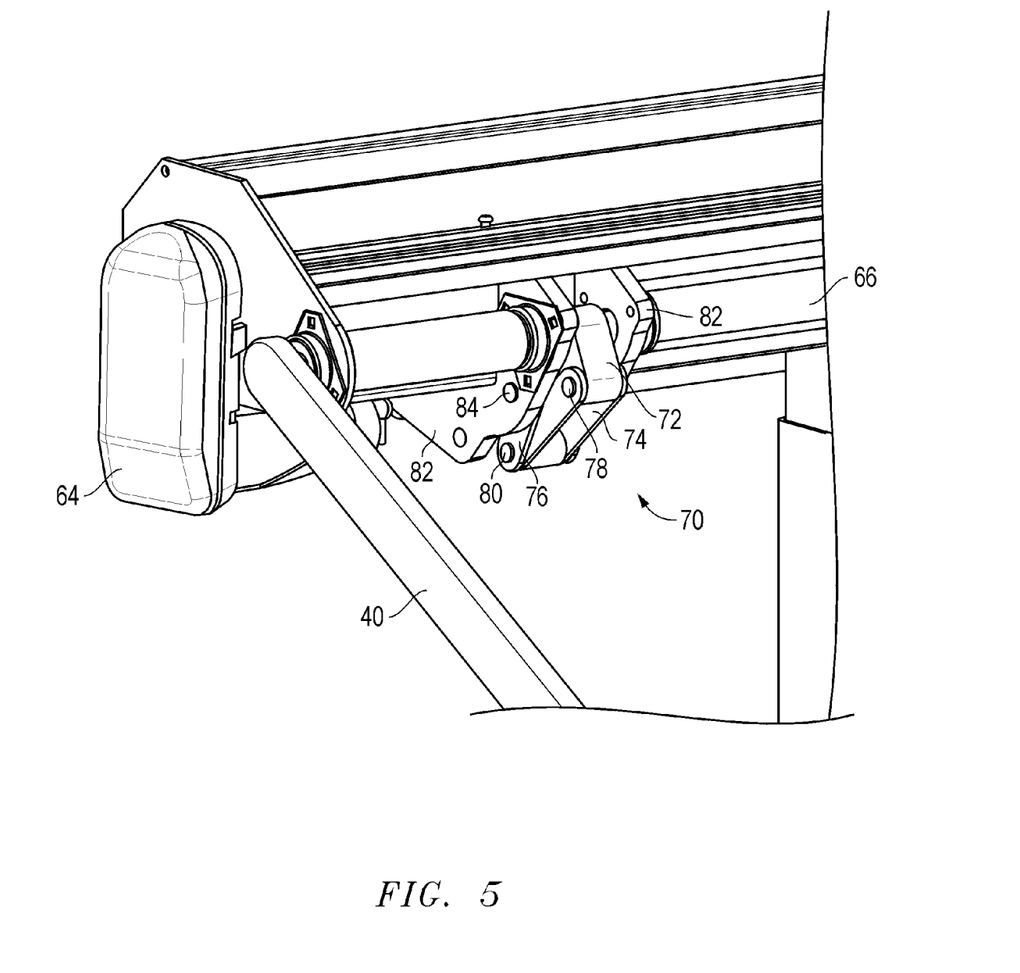
FIG. 5 is a perspective view of the head assembly in a first position.
Figure 6:
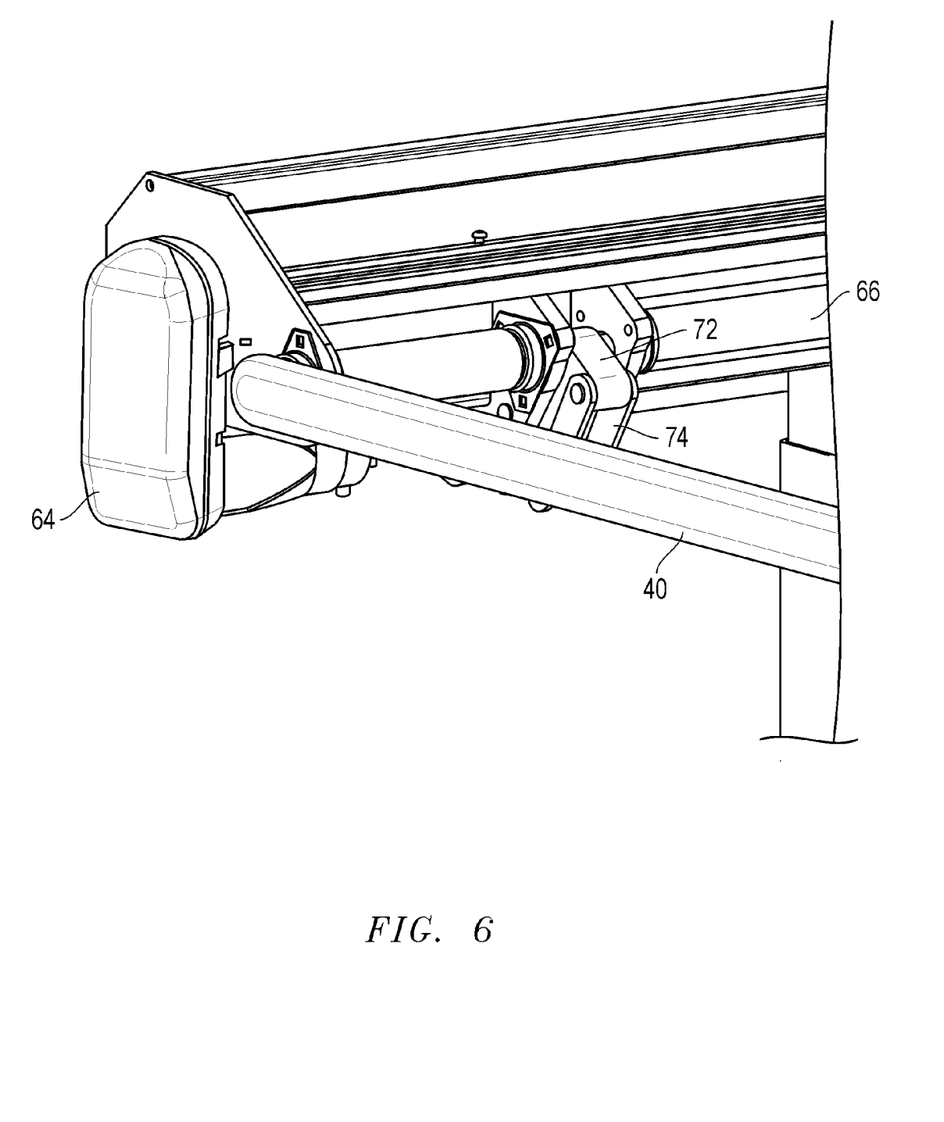
FIG. 6 is a perspective view of the head assembly in a second position.
Figure 7:
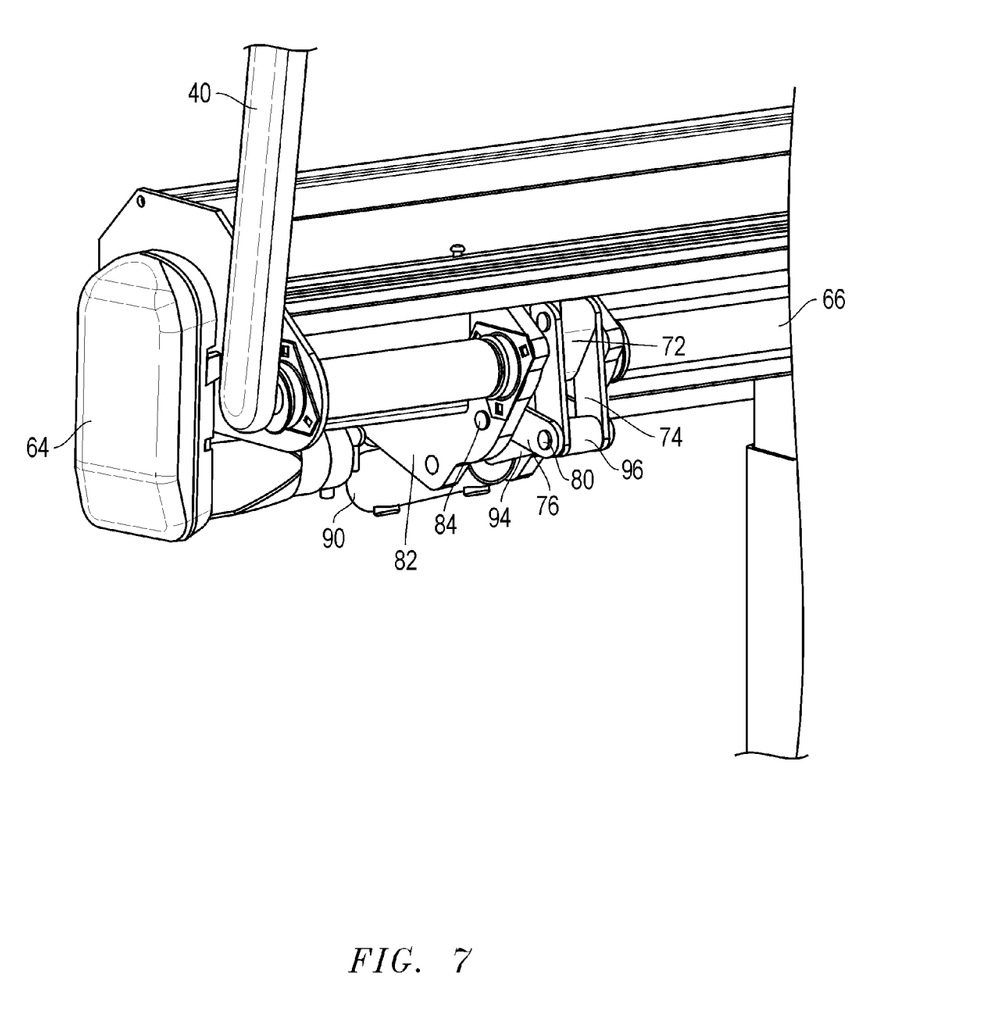
FIG. 7 is a perspective view of the head assembly in a third position.

FIGS. 5 through 7 show a linkage 70 for rotating the axle 66. The linkage 70 includes a first link 72, a second link 74, and a third link 76. The first link 72 is fixed at one end to the axle 66, and rotatably connected to the second link 74 by a pin 78. The opposite end of the second link 74 in turn is rotatably connected to the third link 76 by a pin 80. The opposite end of the third link 76 is rotatably connected to brackets 82 by a pin 84. As the linkage 70 rotates generally counterclockwise as shown, the bases 40 correspondingly rotate through a range of positions from a stowed position shown in FIG. 5 with the bases below horizontal, to one operational position shown in FIG. 6 with the bases generally horizontal, to a loading/unloading position shown in FIG. 7 with the bases at or approaching vertical.

Figure 8:
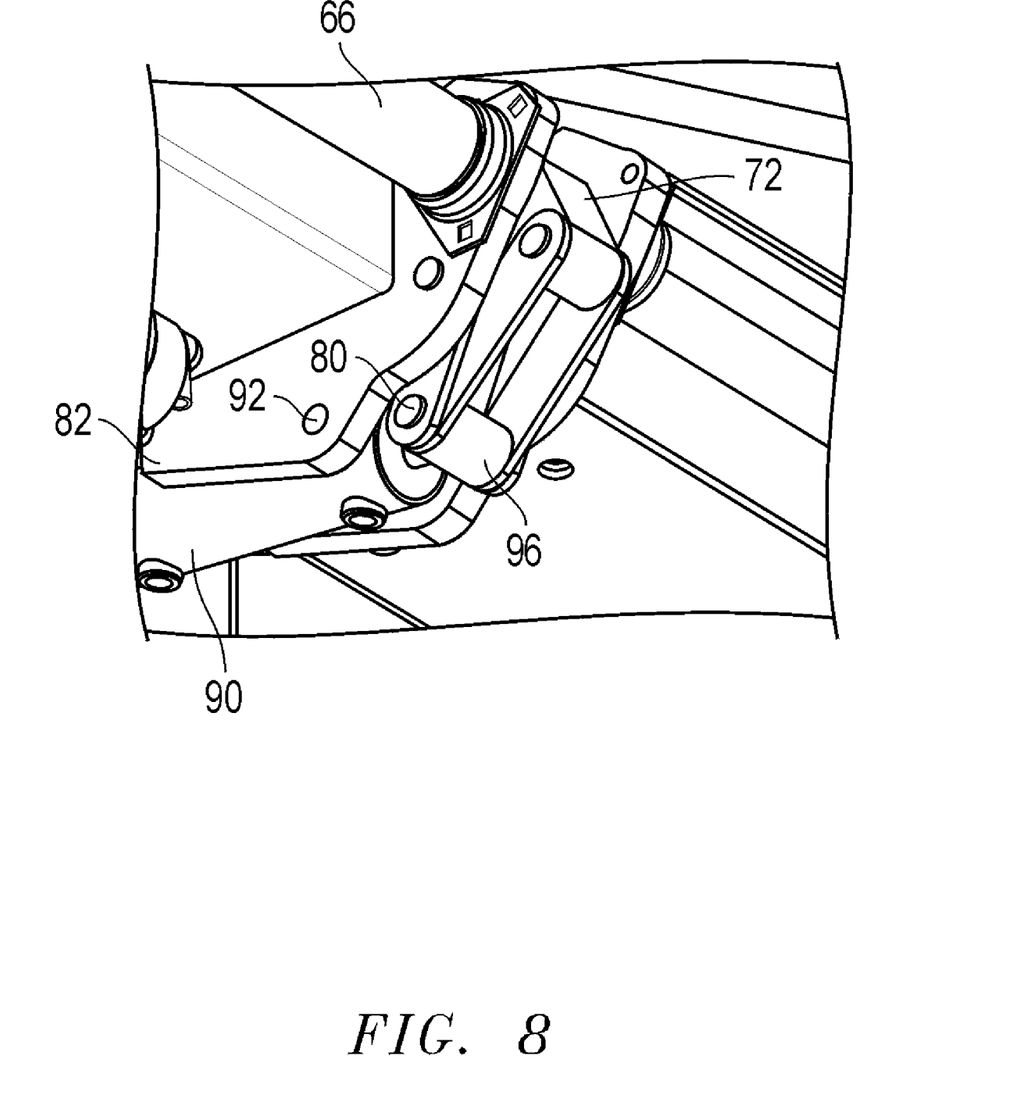
FIG. 8 is a perspective view of a linkage of the head assembly in a first position.
Figure 9:
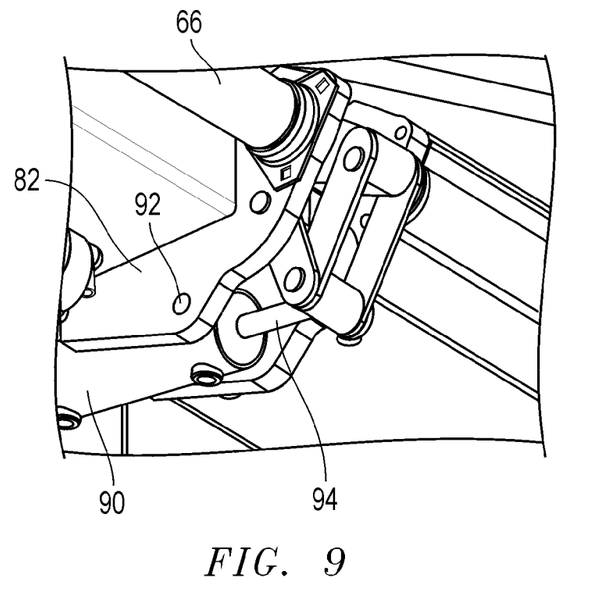
FIG. 9 is a perspective view of the linkage in a second position.
Figure 10:
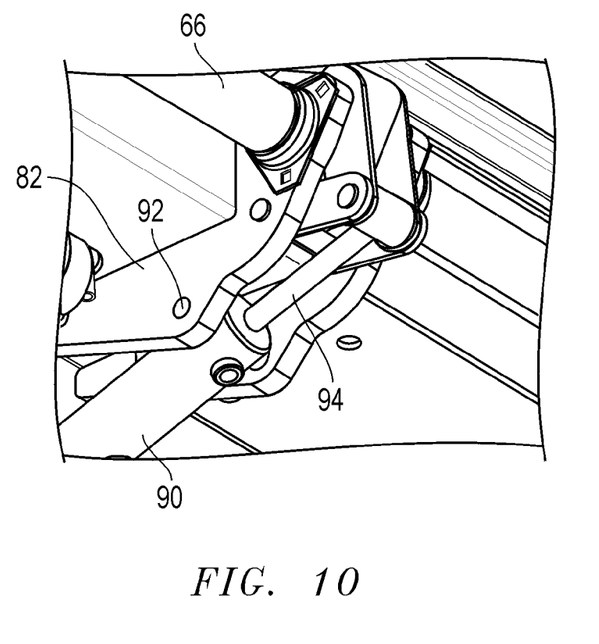
FIG. 10 is a perspective view of the linkage in a third position.

FIGS. 8 through 10 show the linkage 70 in greater detail. A hydraulic cylinder 90 is rotatably mounted to the brackets 82 by pins 92. A rod 94 extends from the cylinder 90, and is welded or otherwise connected to a bushing 96 rotatably disposed on the pin 80. Automatic transmission fluid, oil or other fluid fed into the cylinder 90 moves the rod 94 through its range. The rod 94 in turn moves the linkage through its range, with the link 72 ultimately rotating the axle 66.

Figure 11:
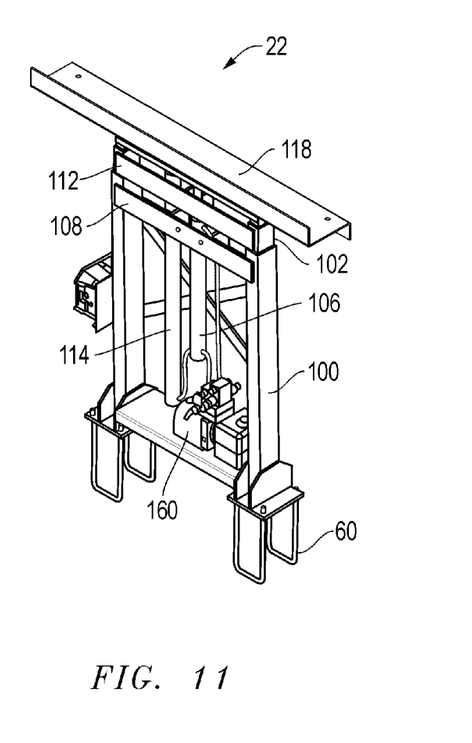
FIG. 11 is a perspective view of the tower in a first position.
Figure 12:
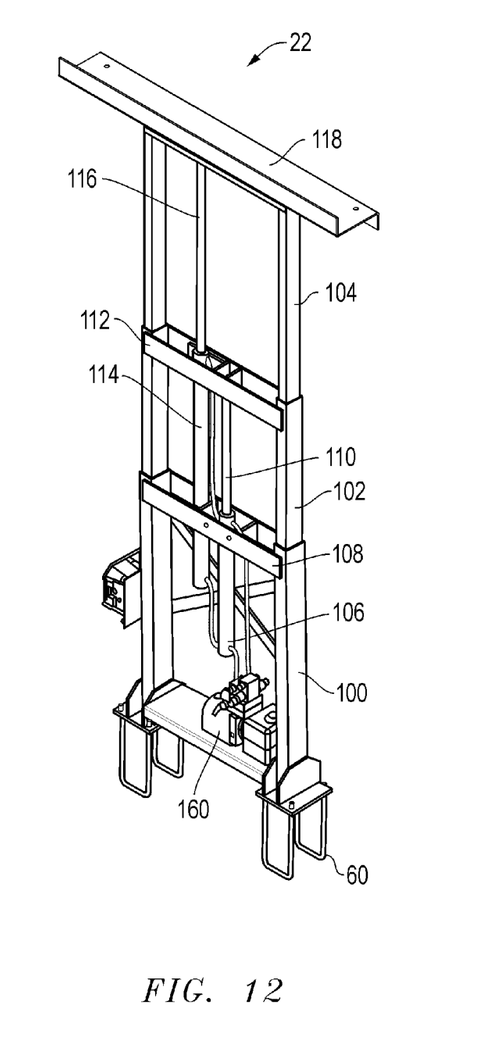
FIG. 12 is a perspective view of the tower in a second position.

FIGS. 11 and 12 show the tower 22 in greater detail. The tower 22 preferably includes a base 100, an intermediate segment 102 telescopically translatable in the base, and an upper segment 104 telescopically translatable in the intermediate segment. A first hydraulic cylinder 106 is fixed generally vertically to a cross member 108 of the base 100. A first rod 110 extends from the first cylinder 106, and engages a cross member 112 of the intermediate segment 102. A second and preferably slightly longer and smaller hydraulic cylinder 114 is fixed generally vertically to the cross member 112. A second rod 116 extends from the second cylinder 114, and engages a support plate 118 for the head assembly 24. Starting from the lowered position shown in FIG. 11, the first rod 110 may be extended to raise the intermediate segment 102 from the base 100. At the same time, thereafter or therebefore, the rod 116 may be extended to raise the upper segment 104 from the intermediate segment.

Figure 13:
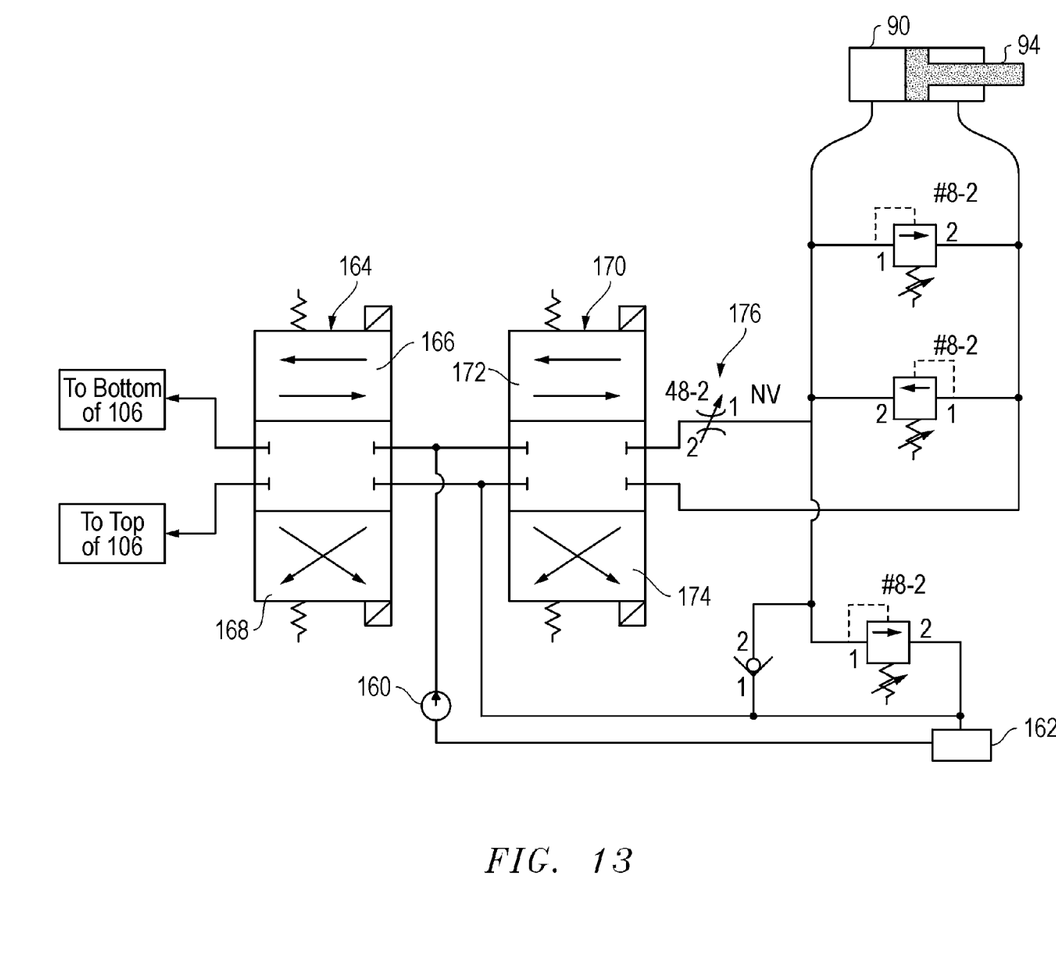
FIG. 13 is a schematic view of a hydraulic circuit for the tower.

FIG. 13 schematically shows an embodiment of one layout for a hydraulic circuit for operating the rod 94 of the linkage 70 and the rod 110 of the cylinder 106. A pump 160, preferably electrically powered so that the truck hydraulics are not disturbed, draws fluid from a reservoir 162. A first valve 164 has an upper position 166 and a lower position 168. With the valve 164 in the upper position 166, the pump 160 forces fluid into the bottom of the shorter, larger diameter cylinder 106 to extend the rod 110. As shown in FIG. 12, hydraulic lines also extend from the bottom of the cylinder 106 to the bottom of the cylinder 114, from the top of the cylinder 114 to the top of the cylinder 106, and from the top of the cylinder 106 back to the valve 164. With the valve 164 in the lower position 168, the pump 160 forces fluid into the top of the cylinder 106 to lower the tower 22.

A second valve 170 controls the linkage 70. The valve 170 has an upper position 172 and a lower position 174. With the valve 170 in the upper position 172, the pump 160 forces fluid into the piston side of the cylinder 90 through a flow control/restrictor valve 176 to extend the rod 94. With the valve 170 in the lower position 174, the pump forces fluid into the rod side of the cylinder 90 to retract the rod 94.

Figure 14:
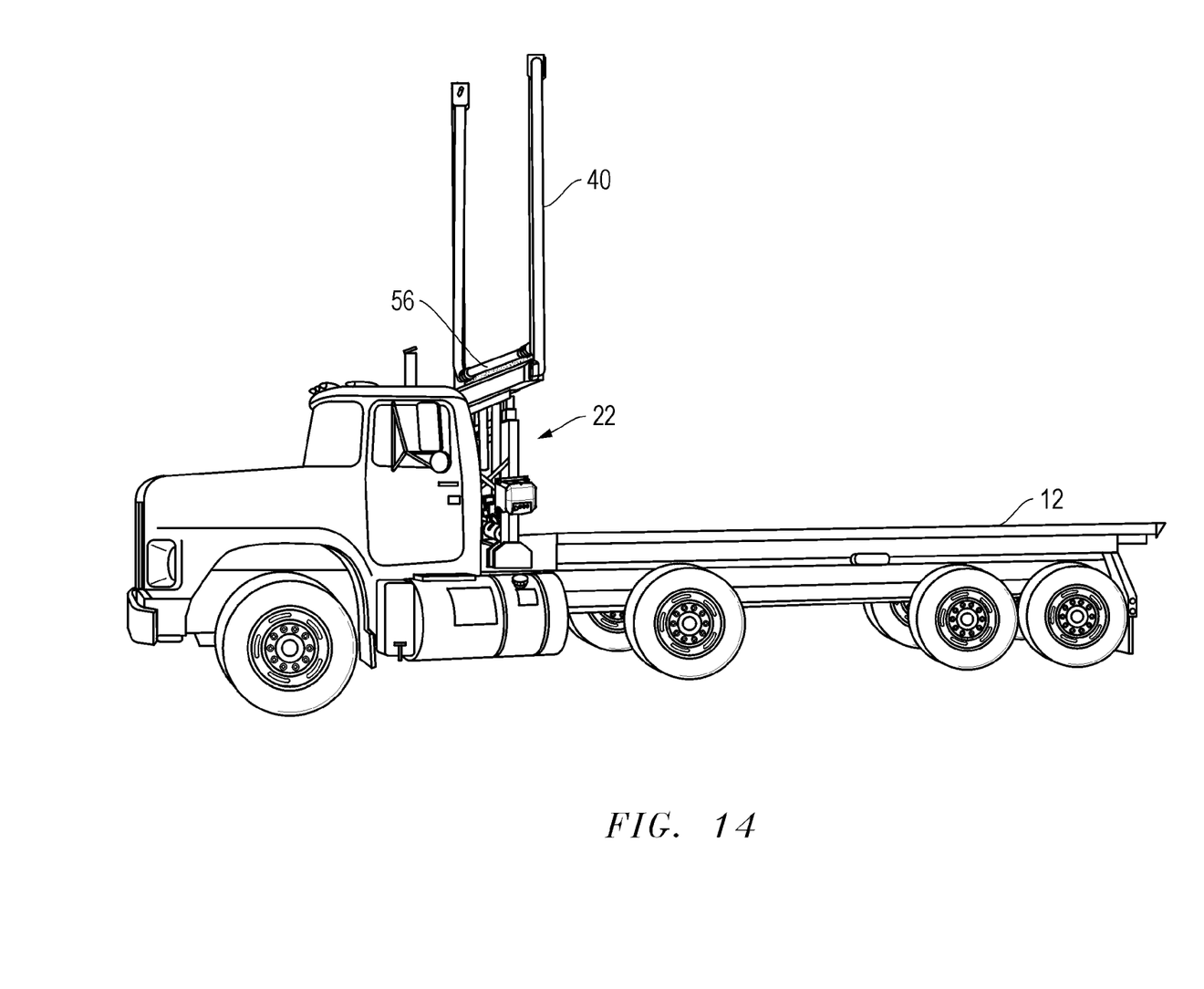
FIG. 14 is a perspective view of the truck with the arm assembly in a loading and unloading position.
Figure 15:
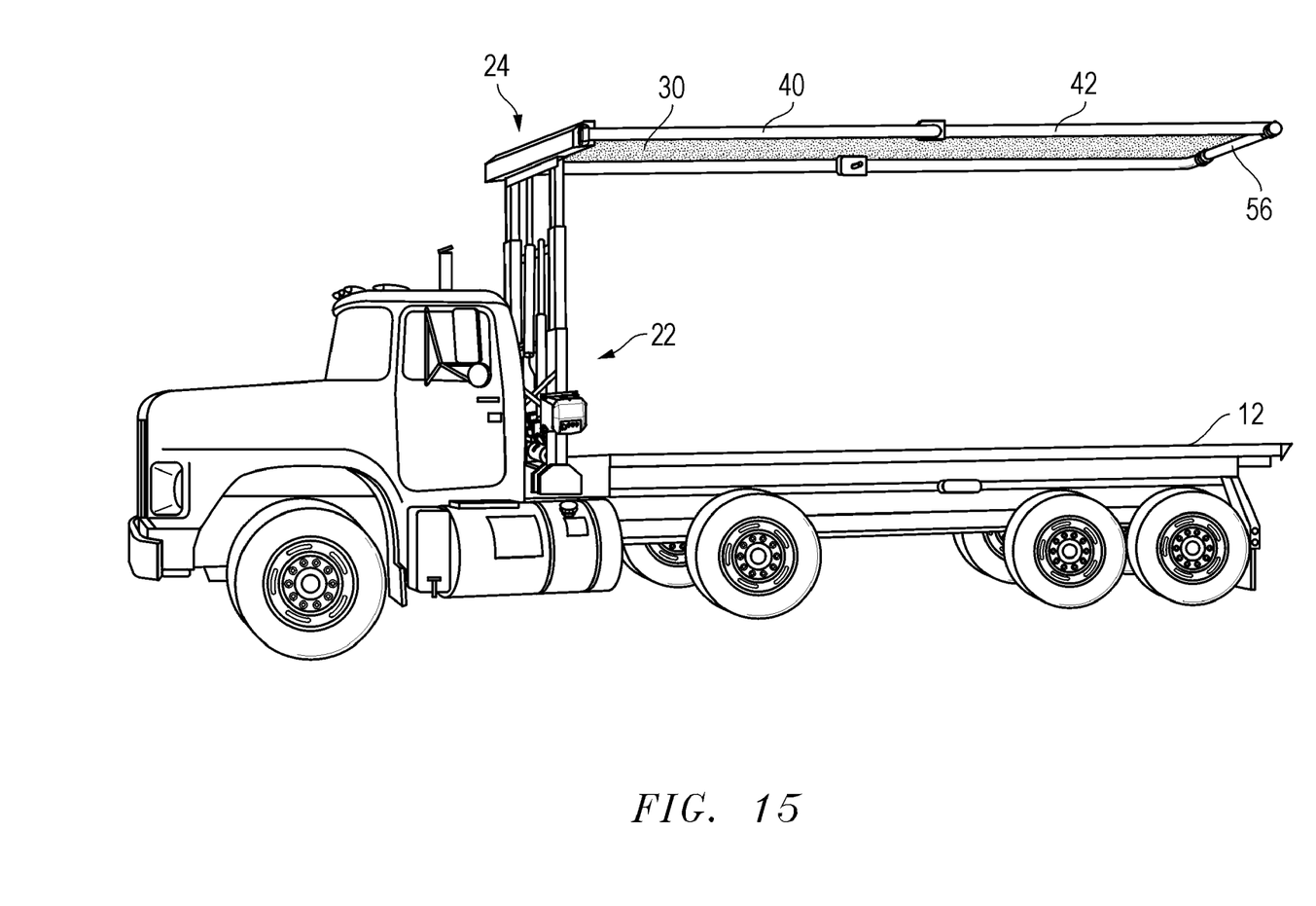
FIG. 15 is a perspective view of the truck with the tower in a raised position.

This hydraulic circuit provides a preferred way to configure the apparatus for loading or unloading, or in a range of operational positions. For loading or unloading in particular, the arms 18 may be rotated above horizontal and the tower 22 may be raised to a position equal to or above the anticipated or actual height of the container on the truck bed as shown in FIG. 14. The bases 40 may then be rotated rearwardly and downwardly until the knuckles 44 rest on the container, and the extensions 42 allowed to rotate into contact with the load or container to deploy the cover, as shown in FIG. 15. If the front end 30 of the cover is still above the container, the tower 22 may be lowered until the bases 40 are generally parallel with the top of the container to draw the cover more closely over the load. If there is no load on the frame 12, the apparatus may be stowed in the position shown in FIG. 16 where the tower is lowered and the arms preferably rest on the fenders of the truck or a rubber stop 190.

Other embodiments, uses, and advantages of the disclosure will be apparent to those skilled in the art from consideration of the specification and practice of the disclosure. The specification and drawings should be considered exemplary only, and the scope of the disclosure is accordingly intended to be limited only by the following claims and equivalents thereof.

The inventioned claimed is:

1. An assembly for covering a load on a truck, the assembly comprising, in combination:
    a tower extendable between a lowered position and a raised position;
    a head assembly mounted on the tower;
    a base attached to an axle, wherein the base is rotatable with respect to the head assembly, and an extension is pivotably connected to the base;
    a cover mounted on the head assembly, with a distal end of the cover attached to the extension; and
    a linkage connected to the axle;
    wherein movement of the linkage rotates the axle with respect to the head assembly, which in turn rotates the base with respect to the head assembly from a stowed position to an operational position, and to a loading/unloading position.

2. The assembly of claim 1 further comprising a hinge connecting the base and the extension, wherein the hinge is adapted to rest on the truck when the base is in the stowed position.

3. The assembly of claim 2 wherein the extension is biased toward a deployed position.

4. The assembly of claim 1 further comprising a second extension connected to the extension by a bow member, wherein the head assembly further comprises a spool, and the cover is windable on the spool.

5. The assembly of claim 4 further comprising a motor drivingly connected to the spool.

6. The assembly of claim 1 wherein the tower is hydraulically operated.

7. The assembly of claim 1 wherein the linkage includes first, second and third links.

8. The assembly of claim 1 wherein the linkage is hydraulically operated.

9. An assembly for covering a load on a truck, the assembly comprising, in combination:
    a tower extendable along a vertical axis between a lowered position and a raised position;
    a head assembly mounted on the tower and stationary with respect to the tower;

an axle mounted on the head assembly and connected to a base and a linkage; and a spool rotatably mounted on the head assembly, the spool adapted to receive a cover;

wherein movement of the linkage rotates the axle which in turn rotates the base with respect to the head assembly from a stowed position, to an operational position and to a loading/unloading position.

10. The assembly of claim 9 further comprising an extension pivotably connected to the base by a hinge, wherein the extension is biased toward a deployed position.

11. The assembly of claim 10 further comprising a second base operatively connected to a second extension, and the second extension is connected to the extension by a bow member.

12. The assembly of claim 11 further comprising a cover windable on the spool, and each of the extensions are pivotably connected to the corresponding bases.

13. The assembly of claim 12 wherein the extensions and the bases are parallel when the base is in the extended position and the extension is in the deployed position.

14. The assembly of claim 10 wherein the extension has a transverse bow member and the cover is attached to extension at the transverse bow member, and when the base is in the unloading/loading position the base, the extension and the hinge are each positioned along the vertical axis, and the head assembly is positioned between the tower and the extension.

15. The assembly of claim 9 wherein the linkage includes a first link, a second link, and a third link, and the first link is attached to the axle, the second link is attached to the first link, and the third link is attached to a hydraulic cylinder.

16. The assembly of claim 9 wherein the hydraulic cylinder is rotatably mounted on the head assembly.

* * * * *